United States Patent
Sahin

(10) Patent No.: US 10,140,537 B2
(45) Date of Patent: Nov. 27, 2018

(54) METHODS AND SYSTEMS FOR CAPTURING BIOMETRIC DATA

(71) Applicant: Tevfik Burak Sahin, Arlington, VA (US)

(72) Inventor: Tevfik Burak Sahin, Arlington, VA (US)

(73) Assignee: DAON HOLDINGS LIMITED, George Town (KY)

( * ) Notice: Subject to any disclaimer, the term of this patent is extended or adjusted under 35 U.S.C. 154(b) by 680 days.

(21) Appl. No.: 13/661,647

(22) Filed: Oct. 26, 2012

(65) Prior Publication Data

US 2014/0118519 A1     May 1, 2014

(51) Int. Cl.
*G06K 9/00*     (2006.01)
*H04N 5/232*     (2006.01)

(52) U.S. Cl.
CPC ..... *G06K 9/00912* (2013.01); *G06K 9/00033* (2013.01); *H04N 5/23222* (2013.01); *H04N 5/23293* (2013.01)

(58) Field of Classification Search
USPC ........... 348/E07.085, 77; 382/115, 117, 124, 382/126, 295, 118, 116, 100, 125, 159; 356/71
See application file for complete search history.

(56) References Cited

U.S. PATENT DOCUMENTS 5,978,494 A * 11/1999 Zhang .......................... 382/117
6,289,113 B1 * 9/2001 McHugh ............ G06K 9/00604
                                                                                               351/218
7,027,509 B2 * 4/2006 Jun ............................ G11B 27/28
                                                                                               348/700

(Continued)

FOREIGN PATENT DOCUMENTS

| EP | 1903509 A1 * | 3/2008 | ......... G07C 9/00158 |
| EP | 1903509 A1 * | 3/2008 | ......... G07C 9/00158 |
| EP | 2654018 A1 * | 10/2013 | ......... G06K 9/00885 |

OTHER PUBLICATIONS

Ong et al., "Touch-less palm print biometrics: Novel design and implementation", Journal Image and Vision Computing archive vol. 26 Issue 12, Dec. 2008, pp. 1551-1560.*

(Continued)

*Primary Examiner* — Mohammed S Rahaman
*Assistant Examiner* — Richard A Hansell, Jr.
(74) *Attorney, Agent, or Firm* — Kevin McDermott, Esq.

(57) ABSTRACT

A method for capturing biometric data is provided that includes capturing a user biometric characteristic positioned freely in space in a video with a mobile device while moving the user biometric characteristic in response to at least one instruction. The video includes frames that each includes a user biometric characteristic image. Moreover, the method includes obtaining frames from the video and determining obtained video frames that include an optimally positioned user biometric characteristic image. The optimally positioned user biometric characteristic image is user biometric data usable for generating accurate authentication transaction results to authenticate the user. The method also includes storing the optimally positioned user biometric characteristic image included in a determined video frame in the mobile device.

9 Claims, 9 Drawing Sheets

(56) References Cited

U.S. PATENT DOCUMENTS

| | | | | |
|---|---|---|---|---|
| 7,616,784 | B2* | 11/2009 | Kocher | G06K 9/00906 382/115 |
| 7,630,545 | B2* | 12/2009 | Cieplinski | G06F 17/3025 382/167 |
| 7,660,442 | B2* | 2/2010 | Sweeney | G06K 9/00033 382/115 |
| 7,676,068 | B2* | 3/2010 | Cervantes | G06K 9/00087 382/115 |
| 8,064,645 | B1* | 11/2011 | Sezille | G06K 9/00013 382/115 |
| 8,184,866 | B2* | 5/2012 | Takaku | G07C 9/00158 382/115 |
| 2006/0023919 | A1* | 2/2006 | Okamura | G06K 9/00362 382/115 |
| 2009/0091531 | A1* | 4/2009 | Hama | G06K 9/00 345/157 |
| 2009/0220128 | A1* | 9/2009 | Irimoto | G06K 9/00255 382/118 |
| 2009/0245585 | A1* | 10/2009 | Manabe | G06K 9/00033 382/107 |
| 2010/0135531 | A1* | 6/2010 | Abe | G06K 9/3216 382/103 |
| 2012/0169464 | A1* | 7/2012 | Aoki | G06K 9/00926 340/5.82 |
| 2012/0189169 | A1* | 7/2012 | Sezille | 382/115 |
| 2013/0027184 | A1* | 1/2013 | Endoh | G06K 9/00013 340/5.83 |
| 2013/0336545 | A1* | 12/2013 | Pritikin | G06K 9/00892 382/116 |

OTHER PUBLICATIONS

Ferman, A.M., S. Krishnamachari, A.M. Tekalp, M.A. Mottaleb, and R. Mehrota, Group-Of-Frames/Pictures Color Histogram Descriptors for Multimedia Applications, Image Processing, IEEE, doi:10.1109/ICIP.2000.900893, Conference on Sep. 10-13, 2000.*

Ferman, A.M., A.M. Tekalp, and R. Mehrota, Robust Color Histogram Descriptors for Video Segment Retrieval and Identifcation, IEEE Transactions on Image Processing, vol. 11, No. 5, May 2002.*

Methani, C. and A.M. Namboodiri, Video Based Palmprint Recognition, 2010 International Conference on Pattern Recognition, IEEE Computer Society, doi: 10.1109/ICPR.2010.334.*

Ferman, A.M., S. Krishnamachari, A.M. Tekalp, M.A. Mottaleb, and R. Mehrota, Group-Of-Frames/Pictures Color Histogram Descriptors for Multimedia Applications, Image Processing, IEEE, doi: 10.1109/ICIP.2000.900893, Conference on Sep. 10-13, 2000 (Year: 2000).*

Ferman, A.M., A.M. Tekalp, and R. Mehrota, Robust Color Histogram Descriptors for Video Segment Retrieval and Identifcation, IEEE Transactions on Image Processing, vol. 11, No. 5, May 2002 (Year: 2002).*

Methani, C. and A.M. Namboodiri, Video Based Palmprint Recognition, 2010 International Conference on Pattern Recognition, IEEE Computer Society, doi: 10.1109/ICPR.2010.334 (Year: 2010).*

* cited by examiner

METHODS AND SYSTEMS FOR CAPTURING BIOMETRIC DATA

BACKGROUND OF THE INVENTION

This invention relates generally to methods and systems for capturing biometric data, and more particularly, to methods and systems for capturing biometric data from biometric characteristics positioned freely in space.

Biometric data is generally captured under controlled conditions during enrollment in authentication systems and during authentication transactions. Such conditions generally include placing a biometric characteristic on a surface such as a platen in a known steady position, applying known illumination to the biometric characteristic, and locating a biometric capture device in a fixed position with respect to, and at a fixed distance from, the platen. Very high quality biometric data is typically captured from biometric characteristics subject to such controlled conditions. However, exercising control over such conditions is generally expensive and is inconvenient for users.

Known techniques for capturing biometric data from biometric characteristics positioned freely in space generally require at least some control over conditions during capture. For example, individuals may be instructed to align a biometric characteristic positioned freely in space with an outline on a surface such as a platen to capture biometric data in a predetermined alignment. However, when capturing biometric data from biometric characteristics positioned freely in space it is difficult to control conditions affecting the quality of biometric data that may be captured. For example, biometric characteristics positioned freely in space may not be placed in a known steady position with respect to a biometric data capture device during capture. Moreover, applying illumination to biometric characteristics positioned freely in space may cause some features of the biometric characteristic to be visible and others to be invisible. The inability to control conditions while capturing biometric data from biometric characteristics positioned freely in space has been known to negatively affect the quality of captured biometric data, and as a result has also been known to negatively affect the accuracy of biometric authentication transaction results.

BRIEF DESCRIPTION OF THE INVENTION

In one aspect, a method for capturing biometric data is provided. The method includes capturing a user biometric characteristic positioned freely in space in a video with a mobile device while moving the user biometric characteristic in response to at least one instruction. The video includes frames that each includes a user biometric characteristic image. Moreover, the method includes obtaining frames from the video, and determining obtained video frames that include an optimally positioned user biometric characteristic image. The optimally positioned user biometric characteristic image is user biometric data usable for generating accurate authentication transaction results to authenticate the user. The method also includes storing the optimally positioned user biometric characteristic image included in a determined video frame in the mobile device.

In another aspect, an apparatus for capturing biometric data is provided. The apparatus includes a processor, a memory, at least one camera, and a screen. The apparatus is configured to capture a user biometric characteristic positioned freely in space in a video while the user biometric characteristic is moved in response to at least one instruction. The video includes frames that each includes a user biometric characteristic image. Moreover, the apparatus is configured to obtain frames from the video and to determine obtained video frames that include an optimally positioned user biometric characteristic image. The optimally positioned user biometric characteristic image is user biometric data usable for generating accurate authentication results to authenticate the user. Furthermore, the apparatus is configured to store the optimally positioned user biometric characteristic image included in a determined video frame.

In yet another aspect, a computer program recorded on a non-transitory computer-readable recording medium is included in a mobile device. The computer program is for capturing user biometric data and includes instructions. When the instructions are read and executed by the mobile device, the instructions cause the mobile device to capture a user biometric characteristic positioned freely in space in photographs while the user biometric characteristic is moved in response to at least one instruction. Each photograph includes a user biometric characteristic image. Moreover, when read and executed by the mobile device, the instructions cause the mobile device to determine photographs that include an optimally positioned user biometric characteristic image. The optimally positioned user biometric characteristic image is user biometric data usable for generating accurate authentication transaction results to authenticate the user. Furthermore, when read and executed by the mobile device, the instructions cause the mobile device to store the optimally positioned user biometric characteristic image included in a determined photograph.

DETAILED DESCRIPTION OF THE INVENTION

Figure 1:
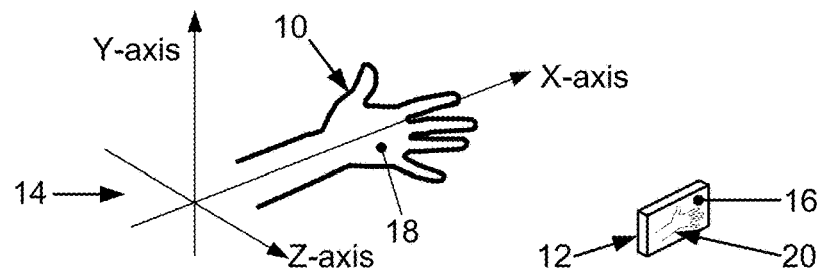
FIG. 1 is a perspective view of an exemplary biometric characteristic positioned freely in space.

FIG. 1 is a perspective view of an exemplary biometric characteristic 10 positioned freely in three-dimensional space while capturing biometric data of the characteristic 10 with a mobile device 12. Biometric characteristics are biological and behavioral characteristics of an individual from which distinguishing, repeatable biometric features can be extracted for the purpose of biometric recognition. The biometric characteristic 10 is the hand of an individual. Alternatively, the biometric characteristic 10 may be any biological characteristic of an individual. Such biometric characteristics 10 include, but are not limited to, face, finger, and palm, and any combination of face, finger and palm. Because the biometric characteristic 10 is positioned freely in space conditions of capture are not controlled. Biometric data of biometric characteristics 10 are typically captured from an individual during enrollment in an authentication system (not shown) or during an authentication transaction.

A three-dimensional Cartesian coordinate system 14 having axes X, Y, and Z is shown oriented about the biometric characteristic 10 such that the X-axis is positioned to extend along a longitudinal axis of the biometric characteristic 10. The three-dimensional Cartesian coordinate system 14 represents the three-dimensional space that the biometric characteristic 10 may freely move through. For example, the biometric characteristic 10 may be rotated clockwise or counterclockwise about the X-axis. Rotating the biometric characteristic clockwise about the X-axis is considered rotating the biometric characteristic 10 towards the mobile device 12. Rotating the biometric characteristic counterclockwise about the X-axis is considered rotating the biometric characteristic 10 away from the mobile device 12. The biometric characteristic 10 may be rotated about any combination of the X, Y, and Z axes, and may be translated along any combination of the X, Y, and Z axes. Moreover, the characteristic 10 may be simultaneously rotated about and translated along any combination of the X, Y and Z axes in any manner.

The mobile device 12 is a smart phone that at least stores applications and data therein, executes applications, displays text and images, and captures authentication data from users. The mobile device 12 includes buttons or icons (not shown) for entering commands and invoking applications stored therein, and a display screen 16 such as, but not limited to, a Liquid Crystal Display (LCD) that displays text and images. Moreover, the mobile device 12 includes cameras (not shown) and a microphone (not shown).

The applications stored in the mobile device 12 cause it to perform at least the functions described herein. For example, the applications may cause the mobile device 12 to process captured biometric data and perform matching of any feature or information associated with individuals to authenticate the identity of individuals during authentication transactions. Data that may be stored in the mobile device 12 includes, but is not limited to, biometric data captured from a user, biometric templates generated from the captured biometric data, and biographic data of the user. Biometric data captured from a user includes, but is not limited to, images of user biometric characteristics captured in a video or photograph. Biographic data includes any demographic information regarding an individual including, but not limited to, an individual's name, age, date of birth, address, citizenship and marital status.

Alternatively, the biometric data captured from a user, biometric templates generated from the captured biometric data, and personal data of the user may not be stored in the mobile device 12. Instead, such data may be transmitted from the mobile device 12 to an authentication system (not shown) for storage therein.

The mobile device 12 may be configured to communicate with other devices (not shown) and other systems (not shown) over networks including, but not limited to, 4G, 3G, Wi-Fi, Global System for Mobile (GSM), Enhanced Data for GSM Evolution (EDGE), and any combination of a local area network (LAN), a wide area network (WAN) and the Internet. The mobile device 12 may also be configured to conduct telephone calls and access the Internet over such networks.

Although the mobile device 12 is a smart phone, the mobile device 12 may alternatively be any device capable of at least storing applications and data, executing applications, displaying at least one of text and images, and capturing and transmitting data. Such other devices include, but are not limited to, a portable cellular phone, a tablet computer, a laptop computer, a camera, and any type of portable communications device having wireless capabilities such as a personal digital assistant (PDA).

The mobile device 12 includes a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the memory (not shown). The above examples are exemplary only, and are thus not intended to limit in any way the definition and/or meaning of the term "processor."

The memory (not shown) can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), flash memory or the like. Similarly, the non-alterable or fixed memory can be implemented using any one or more of ROM (Read-Only Memory), PROM (Programmable Read-Only Memory), EPROM (Erasable Programmable Read-Only Memory), and EEPROM (Electrically Erasable Programmable Read-Only Memory), or the like.

The memories (not shown) can be a computer-readable recording medium used to store data. Moreover, the memory (not shown) can be a transitory or non-transitory computer-readable recording medium used to store computer programs or executable instructions that are executed by the mobile device 12. Moreover, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program and thus causes the computer to perform a function. Applications as described herein are computer programs.

A plane defined by a front face of the mobile device 12 should be substantially parallel to a plane defined by a front surface 18 of the biometric characteristic 10 while capturing biometric data of the characteristic 10 with the mobile device 12. Moreover, the biometric characteristic 10 should be positioned proximate to, and with respect to, the mobile device 12 such that a complete image 20 of the biometric characteristic appears on the display screen 16. The mobile device 12 may capture images of a biometric characteristic in a video or in a sequence of single photographs. Videos include a sequence of frames. The mobile device 12 and biometric characteristic 10 may move relative to each other while capturing biometric data and cause the size of the image 20 displayed on the screen 16 to change. Small changes in the size of the image 20 are acceptable. However, it is best to minimize changes that may occur to the size of the image 20 by maintaining a constant distance between the mobile device 12 and the biometric characteristic while capturing biometric data.

A security application stored in the mobile device 12 facilitates capturing biometric data with the mobile device 12 from biometric characteristics positioned freely in space, and may be invoked by activating a button or icon of the mobile device 12. Users that invoke the security application and otherwise operate the mobile device 12 are operators. An operator of the mobile device 12 may also be the individual offering the biometric characteristic for capture. However, individuals other than the operator may offer the biometric characteristic for capture. The security application causes the mobile device 12 to display guide nodes on the screen 16 for facilitating capture of biometric data from biometric characteristics positioned freely in space, and causes the mobile device 12 to display instructions for capturing biometric data from biometric characteristics positioned freely in space. For example, the instructions may request rotating a biometric characteristic about a longitudinal axis of the biometric characteristic 10 itself.

Due to the time required to analyze the data of each frame, the mobile device 12 does not analyze the data of each frame included in the video. Instead, the mobile device 12 determines frames within the video to analyze. The mobile device 12 may determine which frames to analyze in any manner. For example, the mobile device 12 may determine which frames to analyze based on a frequency whose inverse is larger than or equal to the time required to analyze a frame. Thus, the mobile device 12 may obtain frames for analysis from the video at the calculated frequency. Analyzing a frame includes, but is not limited to, determining an outline of a biometric characteristic image in the frame and calculating an alignment measure AM.

Figure 2:
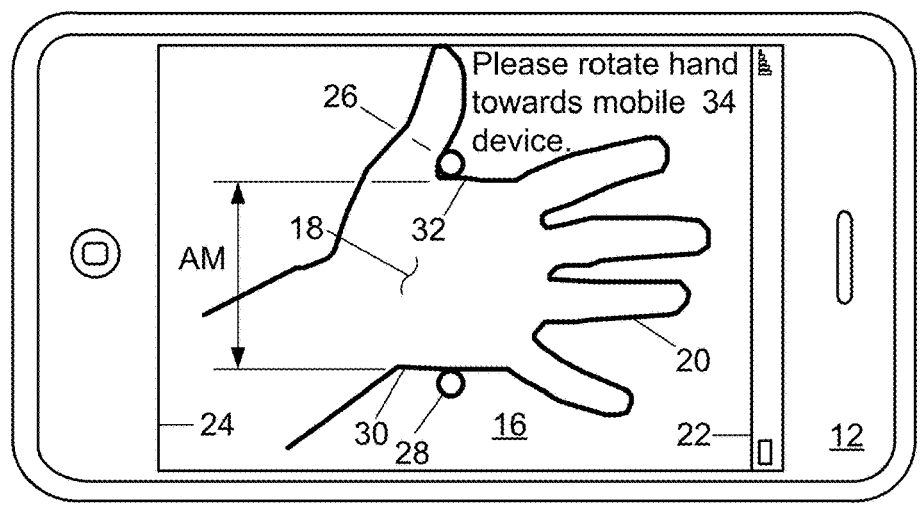
FIGS. 2-8 are enlarged plan views of a mobile device screen illustrating exemplary frames including an image of a biometric characteristic.

FIG. 2 is an enlarged plan view of the screen 16 illustrating an exemplary frame to be analyzed. The frame includes an image 20 of the biometric characteristic 10 as the biometric characteristic 10 is moved or rotated about its longitudinal axis in response to an instruction. The front surface 18 is substantially parallel to a plane of the mobile device front face. The screen 16 includes a first end 22 and a second end 24. Moreover, the screen 16 includes two guide nodes 26, 28 that are fixedly positioned with respect to each other and are positioned intermediate the first 22 and second 24 ends. The image 20 on the screen 16 is aligned with the guide nodes 26, 28 such that the area between the thumb and index finger is positioned about one guide node 26 and an exterior edge 30 of the image 20 is positioned substantially tangent to the other guide node 28. An alignment measure AM may be calculated between the exterior edge 30 and an inner edge 32 of the image 20.

An instruction 34 that prompts an operator to rotate the biometric characteristic 10 about its longitudinal axis towards the mobile device 12 is displayed on the screen 16. The biometric characteristic 10 is to be positioned between the guide nodes 26, 28 while capturing a video of the biometric characteristic 10 moving in accordance with the instructions 34.

The information shown in FIGS. 3-8 is substantially the same information shown in FIG. 2 as described in more detail below. As such, features illustrated in FIGS. 3-8 that are identical to features illustrated in FIG. 2, are identified using the same reference numerals used in FIG. 2.

Figure 3:
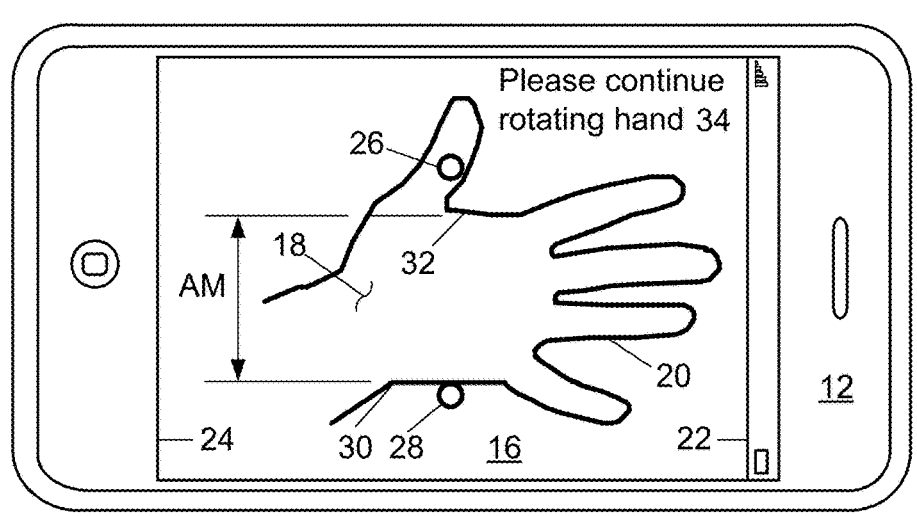
Figure 4:
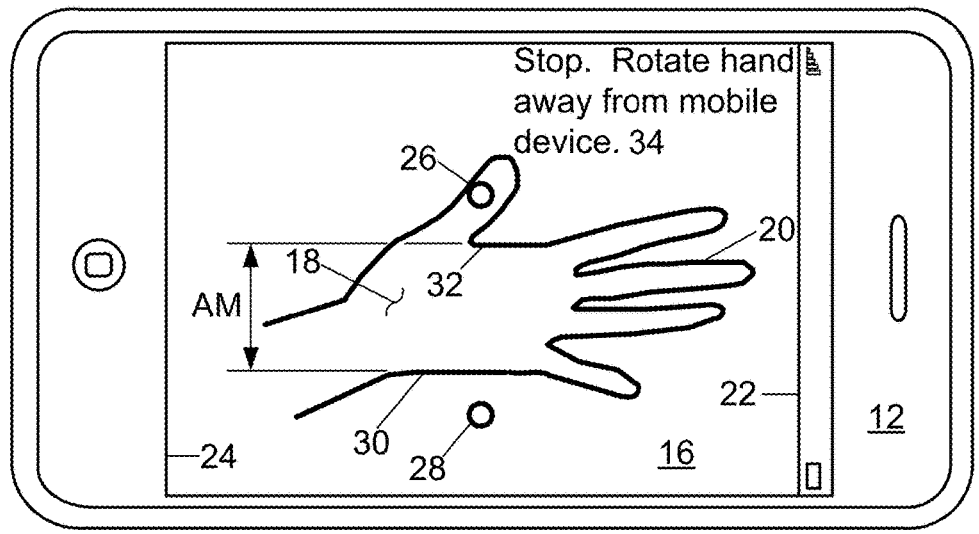

FIGS. 3 and 4 are enlarged plan views of the screen 16 illustrating different exemplary frames of the video that each show a different position of the image 20 while rotating the biometric characteristic 10 towards the mobile device 12. After moving the biometric characteristic 10 into the position illustrated by the image in FIG. 4, a different instruction 34 is shown on the screen 16 prompting the operator to rotate the biometric characteristic 10 away from the mobile device 12.

Figure 5:
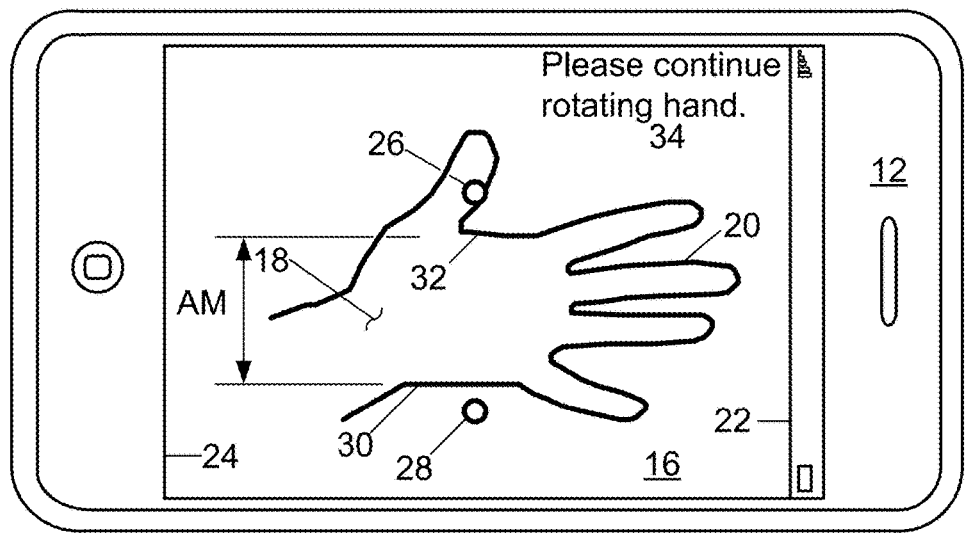
Figure 6:
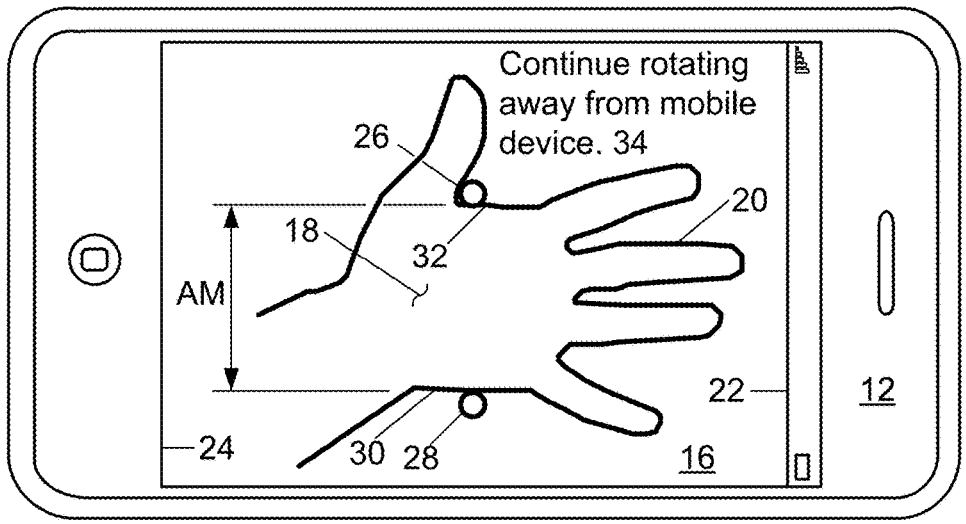
Figure 7:
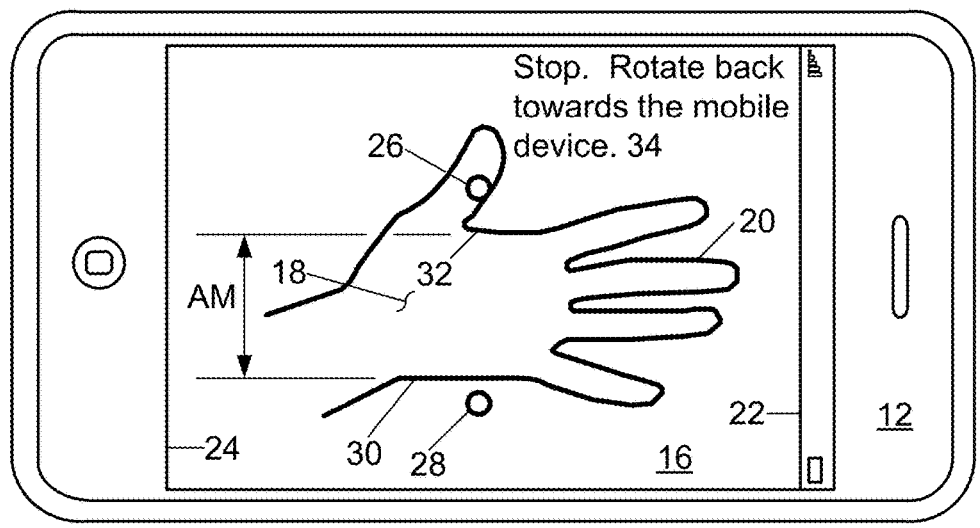

FIGS. 5, 6, and 7 are enlarged plan views of the screen 16 illustrating different exemplary frames of the video that each show a different position of the image 20 while rotating the biometric characteristic 10 away from the mobile device 12. After moving the biometric characteristic 10 into the position illustrated in FIG. 7, a different instruction 34 is shown on the screen 16 prompting rotation of the biometric characteristic 10 towards the mobile device 12 about its longitudinal axis.

Figure 8:
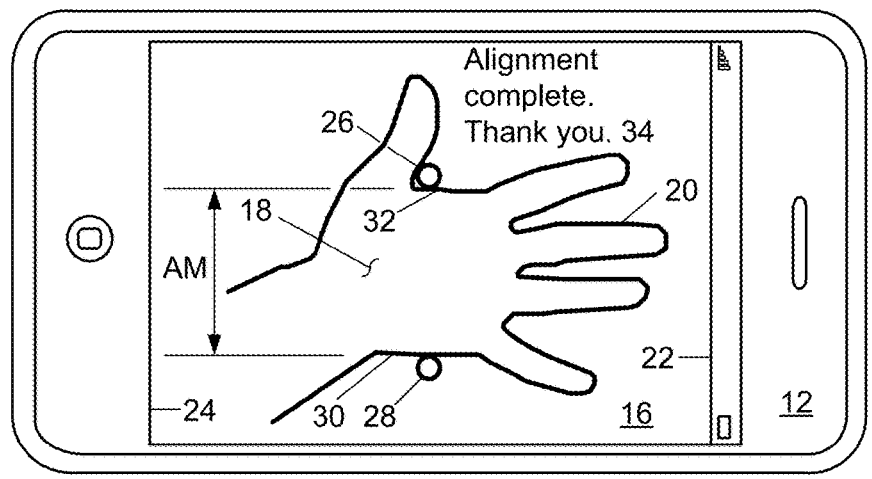

FIG. 8 is an enlarged plan view of the screen 16 illustrating a different exemplary frame of the video showing a position of the image 20 while rotating the biometric characteristic 10 towards the mobile device 12. After moving the biometric characteristic 10 into the position illustrated in FIG. 8, a different instruction 34 is shown on the screen 16 which notifies the operator that alignment is complete. In response, the operator stops capturing video of the biometric characteristic.

Figure 9:
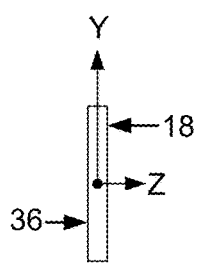
FIGS. 9-15 are diagrams that each illustrate an exemplary cross-sectional representation of the biometric characteristic.

FIG. 9 is a diagram illustrating an exemplary cross-sectional representation 36 of the biometric characteristic 10 with respect to its longitudinal axis, after executing an instruction to align the plane of the mobile device front face and the front surface 18 of the biometric characteristic 10 substantially parallel with each other. The front surface 18 of the biometric characteristic 10 is positioned to face the mobile device 12. The cross-sectional representation 36 as shown in FIG. 9 corresponds to the image 20 of the biometric characteristic 10 illustrated in FIG. 2.

The information shown in FIGS. 10-15 is substantially the same information shown in FIG. 9 as described in more detail below. As such, features illustrated in FIGS. 10-15 that are identical to features illustrated in FIG. 9, are identified using the same reference numerals used in FIG. 9.

Figure 10:
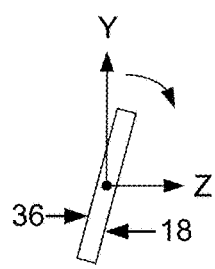

FIG. 10 is a diagram illustrating the exemplary cross-sectional representation 36 after executing an instruction to rotate the biometric characteristic 10, about the X-axis or the longitudinal axis of the biometric characteristic 10, towards the mobile device 12. The cross-sectional representation 36 as shown in FIG. 10 corresponds to the image 20 of the biometric characteristic 10 illustrated in FIG. 3.

Figure 11:
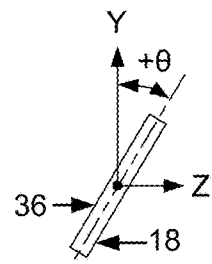

FIG. 11 is a diagram illustrating the exemplary cross-sectional representation 36 after executing an instruction to stop rotating the biometric characteristic 10 towards the mobile device 12. The biometric characteristic 10 is rotated clockwise by an angle $\theta$ relative to the Y-axis. Clockwise angles $\theta$ of rotation relative to the Y-axis indicate rotation of the biometric characteristic 10 towards the mobile device 12, while counterclockwise angles $\theta$ of rotation relative to the Y-axis indicate rotation of the biometric characteristic away from the mobile device 12. The cross-sectional representation 36 as shown in FIG. 11 corresponds to the image 20 of the biometric characteristic 10 illustrated in FIG. 4. After the operator stops rotating the biometric characteristic towards the mobile device 12, another instruction requires rotating the characteristic 10 away from the mobile device 12.

Figure 12:
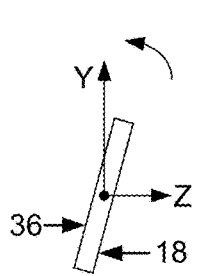
Figure 13:
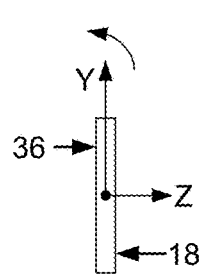

FIGS. 12 and 13 are diagrams illustrating the exemplary cross-sectional representation 36 after rotating the biometric characteristic 10 about the longitudinal axis away from the mobile device 12. The position of the cross-sectional representation 36 illustrated in FIG. 13 corresponds to the image 20 of the biometric characteristic 10 illustrated in FIG. 6.

Figure 14:
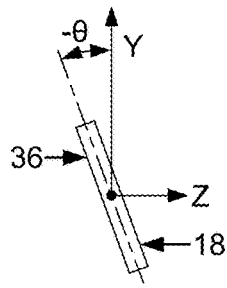

FIG. 14 is a diagram illustrating the exemplary cross-sectional representation 36 after executing an instruction to stop rotating the biometric characteristic 10 away from the mobile device 12. The biometric characteristic 10 is rotated counterclockwise by an angle θ relative to the Y-axis. Thus, the biometric characteristic 10 is rotated away from the mobile device 12. The cross-sectional representation 36 as shown in FIG. 14 corresponds to the image 20 of the biometric characteristic 10 illustrated in FIG. 7. After the operator stops rotating the biometric characteristic 10 away from the mobile device 12, another instruction requires rotating the characteristic 10 towards the mobile device 12.

Figure 15:
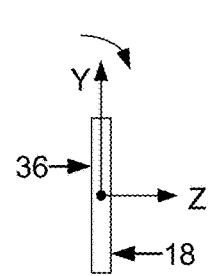

FIG. 15 is a diagram illustrating the exemplary cross-sectional representation 36 after rotating the biometric characteristic 10 towards the mobile device 12. The position of the exemplary cross-sectional representation 36 corresponds to the image 20 of the biometric characteristic 10 illustrated in FIGS. 2 and 6.

An area may be superimposed on any part of the image 20 to facilitate defining a segment, or slice, of the image 20. The segment, or slice, of the image 20 is that part of the image 20 within the area.

Figure 16:
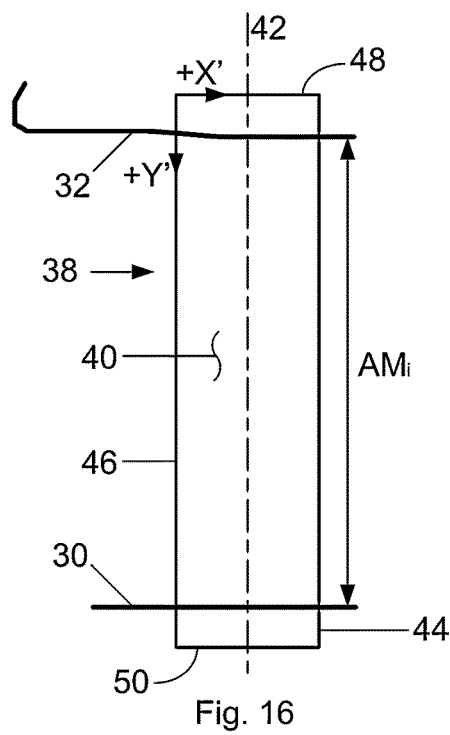
FIG. 16 is an enlarged plan view of the image shown in FIGS. 2-8.

FIG. 16 is an enlarged plan view of an area 38 and a segment 40, including the exterior 30 and interior edges 32, of the exemplary image 20 shown in FIG. 2. The area 38 is a rectangular area. A Cartesian coordinate system having X' and Y' axes is superimposed on the rectangular area 38. A centerline 42 is the centerline of the segment 40 as well as the rectangular area 38. The rectangular area 38 has a first side 44, a second side 46, a top end 48, and a bottom end 50. The first side 44 is positioned any number of pixels away from the centerline 42 towards the first end 22, and the second side 46 is positioned the same number of pixels away from the centerline 42 towards the second end 24. For example, the first 44 and second 46 sides may each be positioned ten pixels from the centerline 42. The top end 48 is positioned along a line that is perpendicular to the sides 44, 46 and passes through the center point of the node 26. The bottom end 50 is positioned along a line that is perpendicular to the sides 44, 46 and passes through the center point of the node 28. Although the area 38 is described herein as a rectangular area 38, the area 38 may alternatively have any shape, for example, a square.

Figure 17:
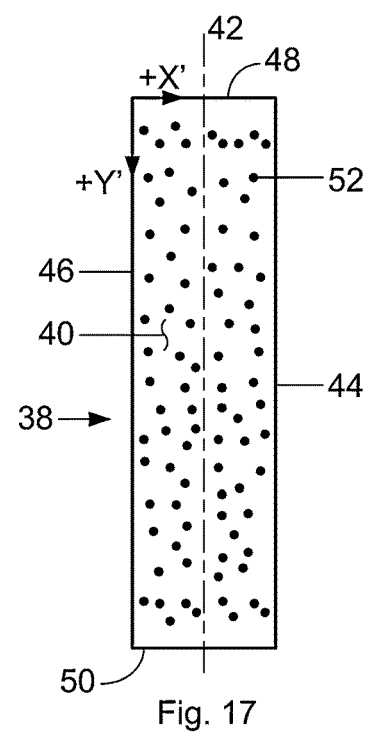
FIG. 17 is a plan view of a segment of the image shown in FIG. 16.

FIG. 17 is a plan view of the rectangular area 38 and segment 40 shown in FIG. 16. However, the segment 40 includes pixels 52 and does not include the interior 32 and exterior 30 edges. The pixels 52 are standard pixels having red, green and blue intensity values that are stored in the mobile device 12 when the image 20 is captured. Coordinates of the pixels 52 are based on the X', Y' Cartesian coordinate system.

After capturing the image 20, the rectangular area 38 is superimposed on any part of the image 20 to define the segment 40. Next, processing continues by determining a gray scale for each of the pixels 52 in the segment 40. As a result of determining the gray scale values, the image segment 40 is transformed into a gray scale image segment. Next, the device 12 continues by applying a Sobel filter to the gray scale image segment along the X' axis which generates a value for each pixel, and by comparing the generated pixel values against a lower bound of negative forty and against a higher bound of eighty. The lower and higher bounds may alternatively be any value that facilitates determining the location of pixels around the interior 32 and exterior 30 edges.

When the generated value of a pixel is greater than the lower bound and less than the higher bound, the pixel value is set to zero. Otherwise, the pixel value is set to two hundred fifty-five (255). As a result of setting the pixel values to zero or two hundred fifty-five (255), the gray scale image segment is converted into to a filtered image segment. The pixels having a value of 255 are generally located around the interior 32 and exterior edges 30.

The device 12 continues by applying a Gaussian smoothing operator to the filtered image segment and generating a value for each pixel included in the filtered image segment. When a generated pixel value is less than a threshold value of twelve, the pixel value is set to zero. Otherwise, the pixel value is set to one. Setting the pixel values to zero or one during the Gaussian smoothing operation converts the filtered image segment into a smoothed filtered image segment. The mobile device 12 continues by applying one level of erosion to the smoothed filtered image segment. More specifically, the device 12 continues by evaluating each pixel included in the smoothed filtered image segment to determine whether any of the pixels has a 4-neighbor pixel valued at zero. If an evaluated pixel in the smoothed filtered image segment has a 4-neighbor pixel valued at zero, the value of the evaluated pixel is also set to zero. Otherwise, the value of the evaluated pixel remains the same. The 4-neighbor pixels are the pixels positioned immediately to the right, left, top, and bottom of a pixel. Next, the mobile device 12 continues by determining a top analysis area and a bottom analysis area of the smoothed filter image segment.

Figure 18:
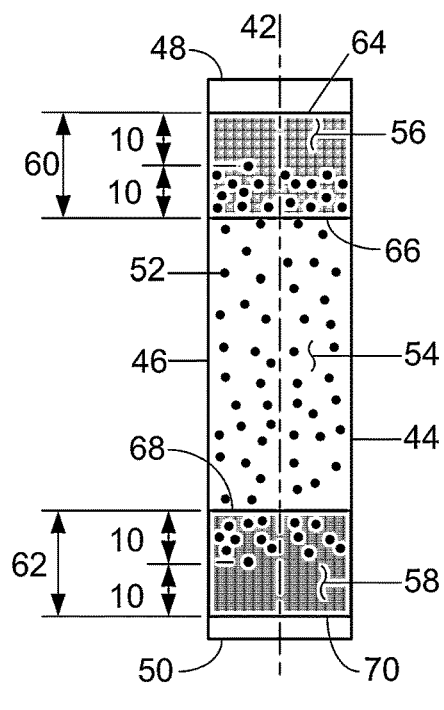
FIG. 18 is an enlarged plan view of a smoothed filtered image segment generated from the segment shown in FIG. 17, including a top analysis area and a bottom analysis area.
Figure 19:
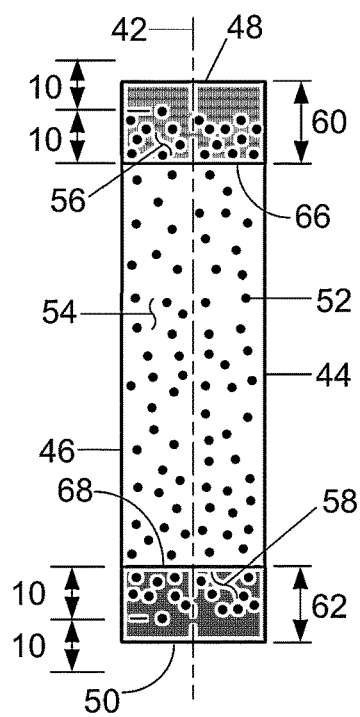
FIG. 19 is a plan view of the smoothed filtered image segment shown in FIG. 18, including a different top analysis area and a different bottom analysis area.

The information shown in FIGS. 18 and 19 is substantially similar to the information shown in FIG. 17 as described in more detail below. As such, features illustrated in FIGS. 18 and 19 that are identical to features illustrated in FIG. 17, are identified using the same reference numerals used in FIG. 17. Although not shown, FIGS. 18 and 19 include the same X', Y' Cartesian coordinate system shown in FIG. 17.

FIG. 18 is an enlarged plan view of a smoothed filtered image segment 54 generated from the segment 40, further including a top analysis area 56 positioned proximate the top end 48, and a bottom analysis area 58 positioned proximate the bottom end 50. The top 56 and bottom areas 58 are the same width as the filtered image segment 54, have upper and lower boundaries, and are shaded. The top area 56 has an upper boundary 64 and a lower boundary 66, while the bottom area 58 has an upper boundary 68 and a lower boundary 70.

The mobile device 12 determines the upper 64, 68 and lower 66, 70 boundaries by calculating the Y' coordinate of each pixel 52, and determining which pixel has a maximum Y' coordinate and which pixel 52 has a minimum Y' coordinate. The mobile device 12 determines the Y' coordinate of the upper boundary 64 by subtracting ten pixels from the pixel 52 having the minimum Y' coordinate, and determines the Y' coordinate of the lower bound 66 by adding ten pixels to the pixel 52 having the minimum Y' coordinate. The mobile device 12 also determines the Y' coordinate of the upper bound 68 by subtracting ten pixels from the pixel 52 having the maximum Y' coordinate, and determines the Y' coordinate of the lower bound 68 by adding ten pixels to the pixel 52 having the maximum Y' coordinate. When the Y' coordinate of the upper bound 64 is a positive value, the determined upper bound 64 constitutes the upper limit of the top analysis area 54. However, when the Y' coordinate of the upper bound 64 is a negative value, the upper bound 64 is determined to be coincident with the top end 48. Thus, the top end 48 is the upper limit of the analysis area 54 when the upper bound 64 is a negative value. When the Y' coordinate of the lower bound 70 is less than the Y' coordinate of the bottom end 50, the lower bound 70 constitutes the lower limit of the bottom analysis area 56. However, when the Y' coordinate of the lower bound 70 is greater than the Y' coordinate of the bottom end 50, the lower bound 70 is determined to be coincident with the bottom end 50. Thus, the bottom end 50 is the lower limit of the bottom analysis area 56 when the Y' coordinate of the lower bound 70 is greater than the Y' coordinate of the bottom end 50.

FIG. 19 is a plan view of the smoothed filtered image segment 54 including the pixels 52, the top area 54 and the bottom area 56 shown in FIG. 18. However, the upper bound 64 and the lower band 70 are coincident with the top end 48 and the bottom end 50, respectively.

Figure 20:
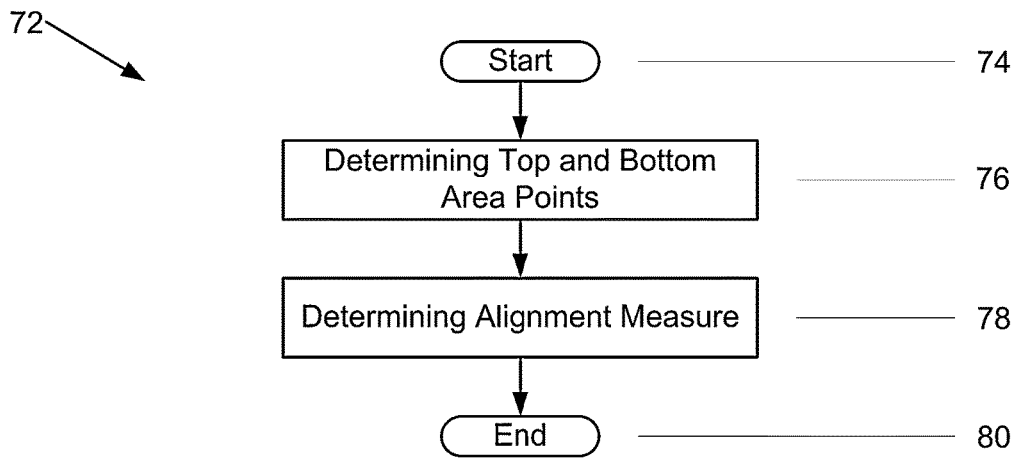
FIG. 20 is a flowchart illustrating an exemplary process for computing an alignment measure.

FIG. 20 is a flowchart 72 illustrating an exemplary process of computing the alignment measure AM for a frame including the image 20. For the mobile device 12, the process starts 74 by determining 76 a point in the top analysis area 56 and a point in the bottom analysis area 58. More specifically, processing continues by calculating an average Y' coordinate for the pixels 52, having non-zero values, included in the top analysis area 56, and calculating an average X' coordinate for the pixels 52, having non-zero values, included in the top analysis area 56. Together, the average X' and Y' coordinates define a top area point (TAP) in the top analysis area 56. The TAP is positioned on the inner edge 32. Similarly, the mobile device 12 calculates an average Y' coordinate for the pixels 52, having non-zero values, included in the bottom analysis area 58, and calculates an average X' coordinate for the pixels 52, having non-zero values, included in the bottom analysis area 58. The BAP is positioned on the exterior edge 30. Together, the calculated average X' and Y' coordinates define a bottom area point (BAP) in the bottom analysis area 58. After determining 76 the TAP and the BAP, the mobile device 12 continues by determining 78 the alignment measure AM as the distance between the TAP and the BAP. Next, processing ends 80.

Figure 21:
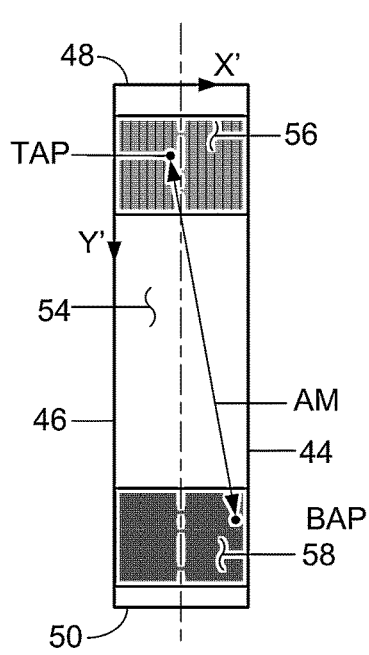
FIG. 21 is a plan view of the smoothed filtered image segment shown in FIG. 18, including a top area point and a bottom area point.

FIG. 21 is a plan view of the smoothed filtered image segment 54 shown in FIG. 18, including only the TAP and the BAP within the top analysis area 56 and the bottom analysis area 58, respectively, and the alignment measure AM between the TAP and BAP. Although the exemplary alignment measure AM is determined as the distance between the TAP and the BAP, the alignment measure AM may alternatively be determined in any manner that facilitates capturing high quality biometric data from biometric characteristics as described herein.

Figure 22:
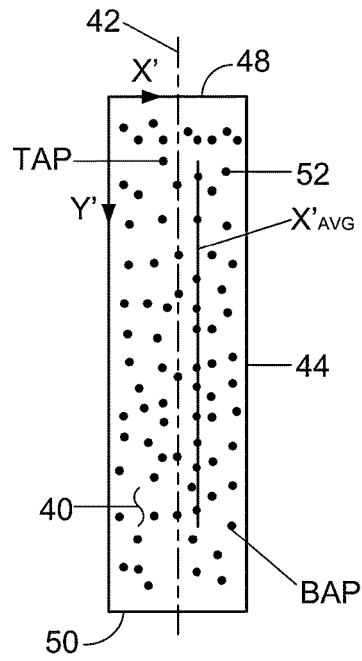
FIG. 22 is a plan view of the segment shown in FIG. 17, further including the top area point and the bottom area point.

FIG. 22 is a plan view of the segment 40 shown in FIG. 17, further including the TAP, the BAP, and an $X'_{AVG}$ line. In an alternative method of computing the alignment measure AM, the mobile device 12 calculates an average X' coordinate as the average X' coordinate of the TAP and of the BAP. Next, the device 12 continues by generating an $X'_{AVG}$ line that passes through the average X' coordinate, is parallel to the sides 44, 46, and extends between the Y' coordinate of the TAP and BAP. The mobile device 12 continues by identifying the pixels located on the $X'_{AVG}$ line and identifying a group of pixels 52 located proximate the center of the image 20. The group of pixels may also be located in an area along the longitudinal X-axis of the biometric characteristic. Such an area generally moves little relative to the device 12 while moving the biometric characteristic 10 in accordance with the instructions 34.

After identifying the group of pixels, the mobile device 12 continues by calculating an average red intensity value, an average green intensity value, and an average blue intensity value for the group of pixels. Next, the device continues by comparing the red, green, and blue intensity values of each pixel located on the $X'_{AVG}$ line against the calculated average red, green, and blue intensity values, respectively. A value is calculated for each comparison. Thus, each pixel is associated with three comparison values. The device 12 continues by evaluating the three comparison values for each pixel located on the $X'_{AVG}$ line to determine whether each of the comparison values is within a tolerance of a threshold value. Next, the device 12 continues by calculating the number of pixels located on the $X'_{AVG}$ line associated with three comparison values within the tolerance of the threshold value. The calculated number of pixels is the alignment measure AM.

In another alternative method of computing the alignment measure AM, the mobile device 12 continues by determining all possible four-connected sets of pixels in the segment 40 and identifying a group of pixels 52 located proximate the center of the image 20. The group of pixels may also be located in an area along the longitudinal X-axis of the biometric characteristic.

After identifying the group of pixels, the mobile device 12 continues by calculating an average red intensity value, an average green intensity value, and an average blue intensity value for the group of pixels. Next, the device continues by comparing the red, green, and blue intensity values of each pixel included in each four-connected set of pixels against the calculated average red, green, and blue intensity values, respectively. A value is calculated for each comparison. Thus, each pixel is associated with three comparison values. The device 12 continues by evaluating the three comparison values for each pixel included each four-connected set of pixels to determine whether each of the comparison values is within the tolerance of the threshold value. Next, the device 12 continues by identifying four-connected sets of pixels in which each pixel has a Y' coordinate greater than the Y' coordinate of the TAP and less than the Y' coordinate of the BAP, and in which each pixel is associated with comparison values within the tolerance of the threshold value. The device 12 continues by determining a largest set of the determined four-connected set of pixels and using the number of pixels in the largest set as the alignment measure AM.

In yet another alternative method of computing the alignment measure AM, the mobile device 12 proceeds by initially determining a line of pixels in which each pixel 52 has the same X' coordinate, and a Y' coordinate between the TAP and the BAP. Next, the mobile device 12 continues by identifying a group of pixels 52 located proximate the center of the image 20. The group of pixels may also be located in an area along the longitudinal X-axis of the biometric characteristic.

After identifying the group of pixels, the mobile device 12 continues by calculating an average red intensity value, an average green intensity value, and an average blue intensity value for the group of pixels. Next, the device continues by comparing the red, green, and blue intensity values of each pixel included in the initially determined line against the calculated average red, green, and blue intensity values, respectively. A value is calculated for each comparison. Thus, each pixel is associated with three comparison values. The device 12 continues by evaluating the three comparison values for each pixel to determine whether each of the comparison values is within the tolerance of the threshold value.

Next, the device 12 continues by counting the number of pixels in the initially determined line having intensity values within the tolerance of the threshold value. The device 12 continues by determining the alignment measure AM to be the counted number of pixels.

As the orientation of the image 20 changes on the screen 16, the alignment measure AM also changes. Consequently, the alignment measure AM is generally different for each frame. The alignment measures AM may be used to facilitate determining frames that include an optimally positioned biometric characteristic image 20 that may be used as biometric data for generating accurate authentication transaction results. However, evaluating the alignment measure AM of each frame may increase the likelihood of determining false optimal positions of the image 20. To reduce the likelihood of determining false optimal positions, different groups of frames are established and a composite alignment measure $AM_C$ is calculated for each different group of frames. For example, the composite alignment measure $AM_C$ may be calculated as the average of the alignment measures AM of the frames in a group. Each group of frames includes ten different frames and each frame is included in only one group. However, the groups of frames may include any number of frames, and thus corresponding alignment measures AM, that facilitates determining optimally positioned images 20 that may be used as biometric data for generating accurate authentication transaction results. The composite alignment measures $AM_C$ associated with each group of frames may be plotted against time to generate a measure of alignment graph.

Figure 23:
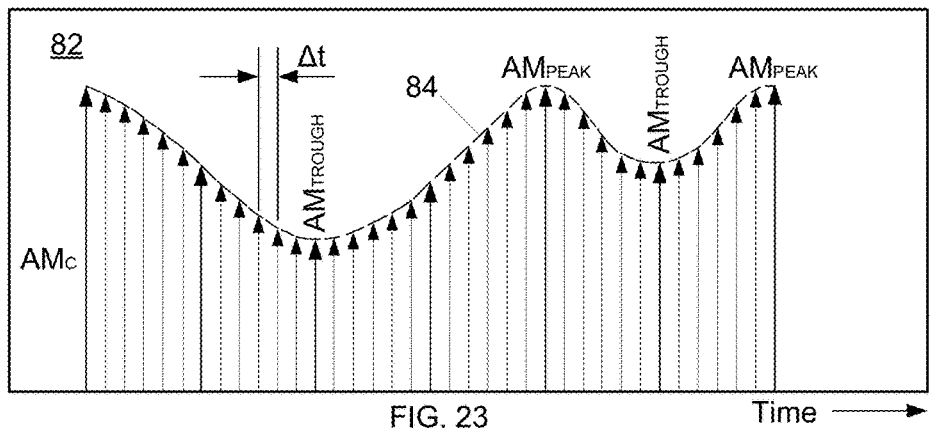
FIGS. 23-25 are diagrams that each include a measure of alignment graph illustrating exemplary alignment measures.

FIG. 23 is a diagram that includes measure of alignment graph 82 illustrating exemplary composite alignment measures $AM_C$ determined over time. More specifically, the graph 82 includes an alignment measure profile 84 that is a continuous representation of the discrete alignment measures $AM_C$. The alignment measure $AM_{PEAK}$ is the composite alignment measure $AM_C$ at the peak, and the alignment measure $AM_{TROUGH}$ is the composite alignment measure at the trough. The profile 84 starts with the biometric characteristic 10 positioned as illustrated in FIGS. 2 and 9 prior to executing instructions.

An alignment measure $AM_{PEAK}$ at a peak in the profile 84 corresponds to the group of frames used to calculate the peak alignment measure $AM_{PEAK}$. Such groups of frames may be referred to as peak frame groups. Each of the frames included in a peak frame group includes an optimally positioned biometric characteristic image 20. Thus, the image 20 from any one of the frames in the peak frame group may be stored in the mobile device 12. The stored optimally positioned image 20 is considered captured biometric data of the biometric characteristic moving freely in space. The mobile device 12 may determine which frame in the peak frame group, and associated optimally positioned image 20, to use in any manner. Troughs in the profile 84 correspond to a change in rotation or movement of the biometric characteristic 10.

Figure 24:
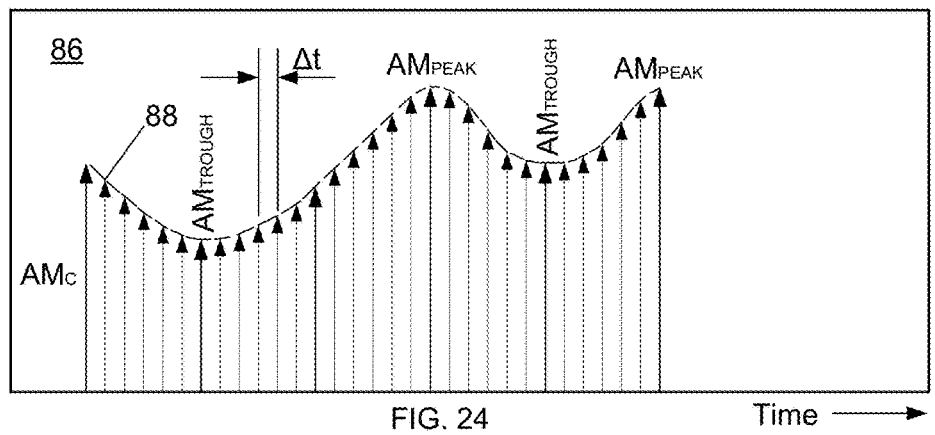
Figure 25:
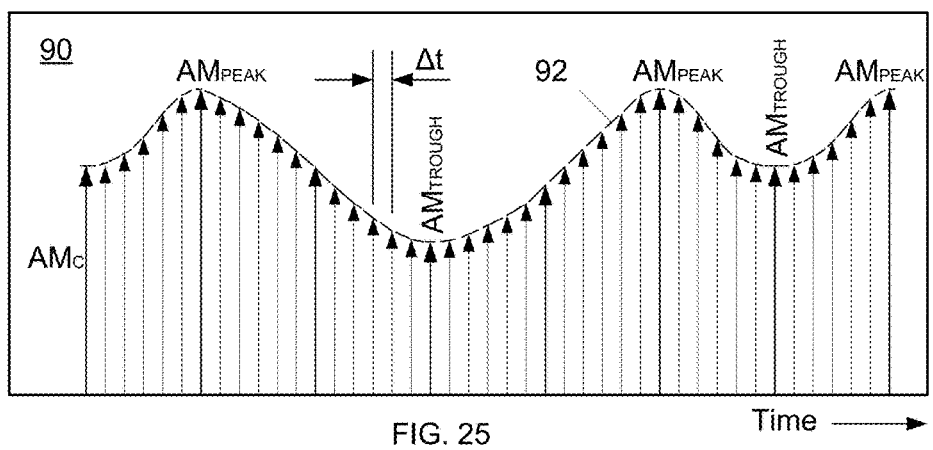

The information shown in FIGS. 24 and 25 is substantially the same information shown in FIG. 23 as described in more detail below. As such, features illustrated in FIGS. 24 and 25 that are identical to features illustrated in FIG. 23, are identified using the same reference numerals used in FIG. 23.

FIG. 24 is a diagram that includes another measure of alignment graph 86 illustrating exemplary alignment measures $AM_C$ over time and includes an alignment measure profile 88. This measure of alignment graph 86 is similar to the graph 82 shown in FIG. 23. However, the profile 88 starts with an alignment measure $AM_C$ that corresponds to the biometric characteristic 10 positioned as illustrated in FIGS. 3 and 10 prior to executing instructions.

FIG. 25 is a diagram that includes yet another measure of alignment graph 90 illustrating exemplary alignment measures $AM_C$ determined over time and includes an alignment measure profile 92. This measure of alignment graph 90 is similar to the graph 82 shown in FIG. 23. However, the profile 92 starts with an alignment measure $AM_C$ corresponding to the biometric characteristic 10 positioned as illustrated in FIGS. 7 and 14 prior to executing instructions.

Figure 26:
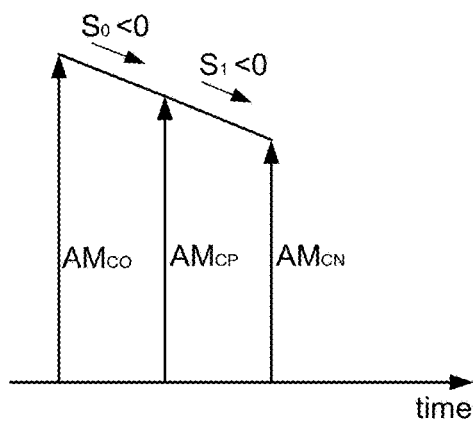
FIGS. 26-29 are diagrams illustrating exemplary composite alignment measures and gradients that may be included in any of the diagrams shown in FIGS. 23-25.

FIG. 26 is a diagram including three consecutive composite alignment measures $AM_C$ and negatively sloping gradients $S_0$, $S_1$, that may be included in any of the graphs 82, 86, 90. The alignment measures $AM_C$ include a new alignment measure $AM_{CN}$, a previous alignment measure $AM_{CP}$, and an old alignment measure $AM_{CO}$. The new alignment measure $AM_{CN}$ is determined from a most recently obtained group of frames, the previous alignment measure $AM_{CP}$ is determined from the next most recently obtained group of frames, and the old alignment measure $AM_{CO}$ is determined from the group of frames obtained prior to the next most recently obtained group. After a new group of frames is obtained and a new alignment measure $AM_{CN}$ is computed for the newly obtained group of frames, the mobile device 12 calculates the gradient $S_1$ between the new alignment measure $AM_{CN}$ and the previous alignment measure $AM_{CP}$, as well as the gradient $S_0$ between the previous alignment measure $AM_{CP}$ and the old alignment measure $AM_{CO}$. Because the new alignment measure $AM_{CN}$ is less than the previous alignment measure $AM_{CP}$ the gradient $S_1$ negative. Likewise, because the previous alignment measure $AM_{CP}$ is less than the old alignment measure $AM_{CO}$ the gradient $S_0$ is negative. The negative gradients $S_0$ and $S_1$ may be the same or different. Consecutive negative gradients $S_0$, $S_1$ indicate the biometric characteristic 10 is rotating away from an optimal position.

When ten consecutive alignment measures $AM_C$ result in negative gradients $S_0$, $S_1$, a new instruction is generated by the security application which generally instructs the operator to rotate the biometric characteristic 10 in an opposite direction. The new instruction is designed to cause the biometric characteristic 10 to at least approach an optimal position for capturing biometric data. Alternatively, any number of consecutive alignment measures AM that result in negative gradients $S_0$, $S_1$ may be used that facilitates quickly determining an optimal position for capturing biometric data.

Figure 27:
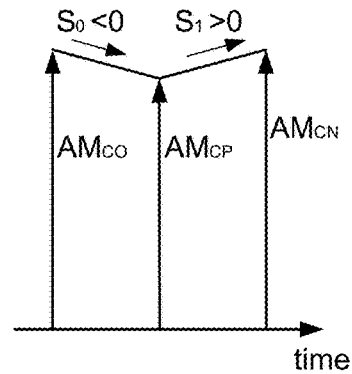

FIG. 27 is another diagram including similar information as shown in FIG. 26, that may be included in any of the graphs 82, 86, 90. However, a different new alignment measure $AM_{CN}$ is included, and the previous $AM_{CP}$ and old $AM_{CO}$ alignment measures have been updated accordingly. More specifically, the alignment measure designated as the new alignment measure $AM_{CN}$ in FIG. 26 has been updated to be the previous alignment measure $AM_{CP}$, and the alignment measure designated as the previous alignment measure $AM_{CP}$ in FIG. 26 has been updated to be the old alignment measure $AM_{CO}$. The new alignment measure $AM_{CN}$ is greater than the updated previous alignment measure $AM_{CP}$. Consequently, the gradient $S_1$ is positive while the gradient $S_0$ is negative. A trough in a profile 84, 88, 92 is defined where a negative gradient is followed by a positive gradient. Thus, by virtue of meeting at the updated previous alignment measure $AM_{CP}$, the negative gradient $S_0$ followed by the positive gradient $S_1$ define a trough at the updated previous alignment measure $AM_{CP}$.

Figure 28:
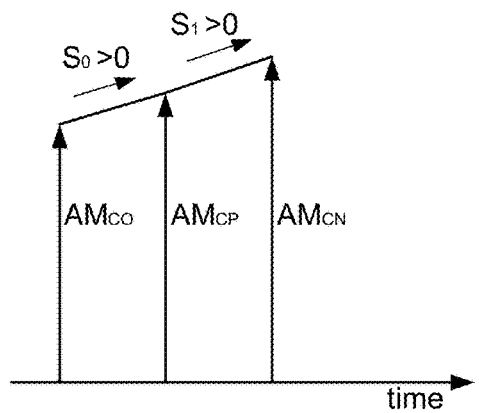

FIG. 28 is another diagram including similar information as shown in FIGS. 26 and 27 that may be included in any of the graphs 82, 86, 90. However, yet another different new alignment measure $AM_{CN}$ is included, and the previous $AM_{CP}$ and old $AM_{CO}$ alignment measures of FIG. 27 have been updated in substantially the same manner as described herein with regard to the previous $AM_{CP}$ and old $AM_{CO}$ alignment measures of FIG. 26. The new alignment measure $AM_{CN}$ is greater than the updated previous alignment measure $AM_{CP}$ which is greater than the updated old alignment measure $AM_{CO}$. Consequently, the gradients $S_0$ and $S_1$ are both positive. The gradients $S_0$ and $S_1$ may be the same or different.

Figure 29:
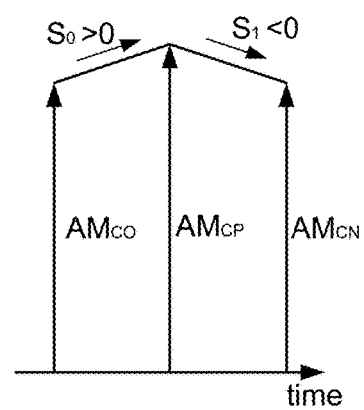

FIG. 29 is yet another diagram including similar information as shown in FIGS. 26, 27, and 28, that may be included in any of the graphs 82, 86, 90. However, the previous $AM_{CP}$ and old $AM_{CO}$ alignment measures have been updated to account for yet another different new alignment measure $AM_{CN}$. The new alignment measure $AM_{CN}$ is less than the updated previous alignment measure $AM_{CP}$ which is greater than the updated old alignment measure $AM_{CO}$. Consequently, the gradient $S_0$ is positive and the gradient $S_1$ is negative. A peak in a profile 84, 88, 92 is defined where a positive gradient is followed by a negative gradient. Thus, by virtue of meeting at the previous alignment measure $AM_{CP}$, the positive gradient $S_0$ followed by the negative gradient $S_1$ define a peak at the previous alignment measure $AM_{CP}$. Thus, the previous alignment measure $AM_{CP}$ is considered to be a peak alignment measure $AM_{PEAK}$.

Figure 30:
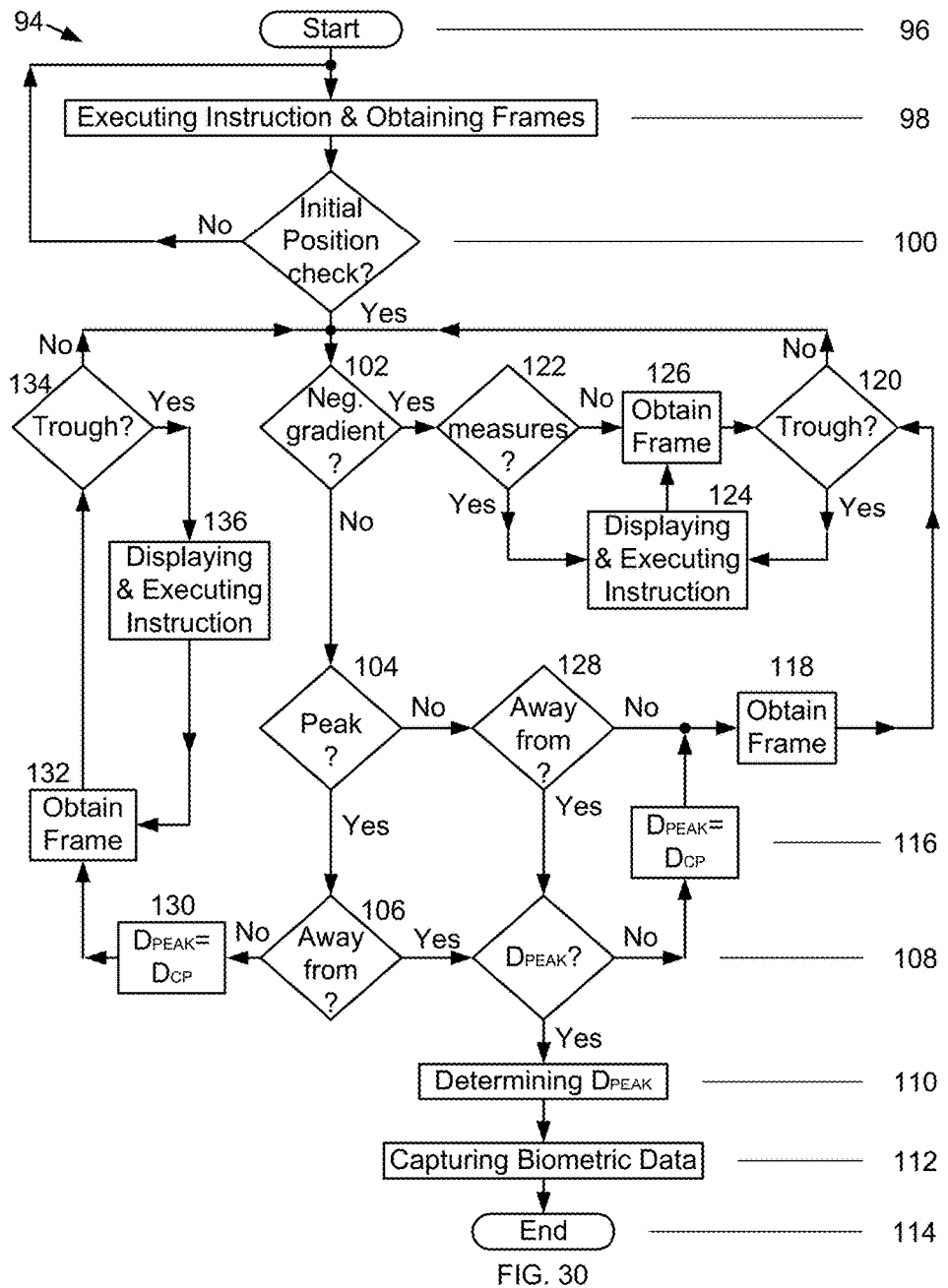
FIG. 30 is a flowchart illustrating an exemplary process for capturing biometric data with the mobile device from the biometric characteristic positioned freely in space.

FIG. 30 is a flowchart 94 illustrating an exemplary process for capturing biometric data with the mobile device 12 from a biometric characteristic 10 positioned freely in space. The exemplary process starts 96 with an operator invoking the security application, and capturing video of the biometric characteristic 10 while aiming the mobile device 12 at the biometric characteristic 10 and arranging the image 20 on the screen 16 between the guide nodes 26, 28. The biometric characteristic 10 is a hand. After arranging the image 20 between the guide nodes 26, 28, a first instruction appears on the screen 16 prompting the operator to continue by rotating the biometric characteristic about its longitudinal axis towards the mobile device 12. While executing the first instruction 98, the operator continues capturing video with the mobile device 12, and the mobile device 12 automatically obtains frames for analysis and determining groups of frames. The first, second, and third composite alignment measures $AM_C$ determined after starting to execute the instructions are designated as old $AM_{CO}$, previous $AM_{CP}$, and the new $AM_{CN}$ alignment measures, respectively.

Processing continues by conducting an initial position check 100 of the mobile device 12. More specifically, processing continues by calculating the gradients $S_0$ and $S_1$ and determining 100 whether the gradients $S_0$ and $S_1$ define a trough. If so, the mobile device 12 is not in a proper initial position and processing continues by again arranging the biometric characteristic 10 between the guide nodes 26, 28, executing the instruction 98, and obtaining frames for analysis 98.

Otherwise, the mobile device 12 is in a proper initial position 100 and processing continues by determining whether or not the gradients $S_0$ and $S_1$ are both negative 102. If the gradients $S_0$ and $S_1$ are not both negative, processing continues by determining whether the gradients $S_0$ and $S_1$ define a peak 104. When the gradients $S_0$ and $S_1$ define a peak 104, processing continues by evaluating the position of the biometric characteristic 10 to determine whether or not it is rotated away from 106 the mobile device 12. When the biometric characteristic 10 is rotated away from 106 the mobile device 12, processing continues by determining 108 whether a peak alignment measure $AM_{PEAK}$ was previously determined. If a peak alignment measure $AM_{PEAK}$ was previously determined, processing continues by determining 110 the peak alignment measure $AM_{PEAK}$ to be the largest of the previously determined $AM_{PEAK}$, the new alignment measure $AM_{CN}$, or the previous alignment measure $AM_{CP}$. Next, processing continues by capturing biometric data 112 corresponding to the determined $AM_{PEAK}$. Biometric data is captured by storing an image 20 of the biometric characteristic in the mobile device 12. Next, processing ends 114.

However, when a maximum alignment measure $AM_{PEAK}$ was not previously determined 108, processing continues by determining 116 that the alignment measure $AM_{CP}$ is the maximum alignment measure $AM_{PEAK}$. Processing continues by executing the instruction 34 while the mobile device 12 continues obtaining 118 frames for analysis and determining 118 a new group of frames. After determining the new group of frames 118, the mobile device 12 continues by determining the alignment measure $AM_{CN}$ of the new group of frames, the gradients $S_0$ and $S_1$, and whether the gradients $S_0$ and $S_1$ define a trough 120. If the gradients $S_0$ and $S_1$ do not define a trough 120, processing continues by determining whether or not the gradients $S_0$ and $S_1$ are negative 102.

When it is determined that the gradients $S_0$ and $S_1$ are both negative 102, processing continues by determining 122 whether a number, for example, ten, of consecutive alignment measures $AM_C$ resulting in negative gradients $S_0$, $S_1$ have been determined. In alternative processes any number of consecutive alignment measures resulting in negative gradients $S_0$, $S_1$ may be used that facilitates determining optimally positioned biometric characteristic images 20 as described herein.

If ten consecutive alignment measures $AM_C$ have resulted in negative gradients $S_0$, $S_1$, a new instruction is displayed 124 on the screen 16 requesting the operator to continue by rotating the biometric characteristic about its longitudinal axis away from the mobile device 12. While executing the new instruction 124, the operator continues capturing video with the mobile device 12 which continues by obtaining frames 126 for analysis and determining 126 a new group of frames. However, when ten consecutive alignment measures $AM_C$ have not resulted in negative gradients $S_0$, $S_1$ 122, the operator continues executing the first instruction and the mobile device 12 continues by obtaining frames 126 and determining a new group of frames 126.

After determining the new group of frames 126, the mobile device 12 continues by determining the new alignment measure $_{AMCN}$, the gradients $S_0$ and $S_1$, and whether the gradients $S_0$ and $S_1$ define a trough 120. If the gradients $S_0$ and $S_1$ define a trough 120, a new instruction is displayed 124 on the screen 16 requesting the operator to continue by rotating the biometric characteristic about its longitudinal axis away from the mobile device 12. While executing the new instruction 124, the operator continues capturing video with the mobile device 12 which continues by obtaining frames 126 for analysis and determining 126 a new group of frames. When the gradients $S_0$ and $S_1$ do not define a trough 120, processing continues by determining whether or not the gradients $S_0$ and $S_1$ are negative 102. When the gradients $S_0$ and $S_1$ are negative, processing continues by determining whether the gradients $S_0$ and $S_1$ define a peak 104.

When the gradients $S_0$ and $S_1$ do not define a peak 104, processing continues by determining whether the biometric characteristic is rotated away from 128 the mobile device 12. When the biometric characteristic 10 is not rotated away from 128 the mobile device 12, the mobile device 12 continues by obtaining frames 118 for analysis and determining 118 a new group of frames. However, when the biometric characteristic 10 is rotated away from 128 the mobile device 12 processing continues by determining 108 whether a peak alignment measure $AM_{PEAK}$ was previously determined. However, when the gradients $S_0$ and $S_1$ define a peak 104, processing continues by determining whether or not the biometric characteristic is rotated away from 106 the mobile device 12. When the biometric characteristic is not rotated away from 106 the mobile device 12, processing continues by determining 130 the peak alignment measure $AM_{PEAK}$ to be the alignment measure $AM_{CP}$ of the previous group of frames.

Next, the operator continues executing the instruction and the mobile device 12 continues by obtaining 132 frames for analysis and determining 132 a new group of frames. The mobile device 12 continues by determining the alignment measure $AM_{CN}$ of the new group of frames, the gradients $S_0$ and $S_1$, and whether the gradients $S_0$ and $S_1$ define a trough 134. If the gradients $S_0$ and $S_1$ define a trough 134, a new instruction is displayed 136 on the screen 16 requesting the operator to continue by rotating the biometric characteristic 10 about its longitudinal axis away from the mobile device 12. While executing the new instruction 136, the operator continues capturing video with the mobile device 12 which continues by automatically obtaining 132 frames for analysis and determining 132 a new group of frames. However, when the gradients $S_0$ and $S_1$ do not define a trough 134, processing continues by determining whether the gradients $S_0$ and $S_1$ are both negative 102.

The exemplary processes and systems described herein facilitate capturing high quality biometric data from biometric characteristics positioned freely in space, and facilitate increasing the accuracy of biometric authentication transaction results based on biometric data captured from biometric characteristics positioned freely in space. More specifically, a video of a user biometric characteristic positioned freely in space is captured with a mobile device while rotating the biometric characteristic in accordance with instructions. The video includes frames that each include an image of the user biometric characteristic. Groups of frames are obtained from the video, and an alignment measure is calculated for each group before another group is obtained. The alignment measures are processed to identify a peak alignment measure and the group of frames associated with the peak alignment measure. After determining the associated group of frames, the image of the biometric characteristic in any one of the associated frames is stored in the mobile device. As a result, the quality of biometric data captured from biometric characteristics positioned freely in space is facilitated to be increased, and the accuracy of authentication transaction results based on biometric data captured from biometric characteristics positioned freely in space are facilitated to be increased. Accordingly, biometric authentication of identities based on biometric data captured from biometric characteristics positioned freely in space is facilitated to be enhanced in a cost effective and reliable manner.

Exemplary embodiments of authentication processes and systems for capturing high quality biometric data from biometric characteristics positioned freely in space are described above in detail. The processes are not limited to use with the specific computer system embodiments described herein, but rather, the processes can be utilized independently and separately from other processes described herein. Moreover, the invention is not limited to the embodiments of the processes and systems described above in detail. Rather, other variations of the processes may be utilized within the spirit and scope of the claims.

While the invention has been described in terms of various specific embodiments, those skilled in the art will recognize that the invention can be practiced with modification within the spirit and scope of the claims.

What is claimed is:

1. A method for capturing biometric data comprising:
   capturing as a video, by a mobile device aimed at the face of a user, images of the face rotating in response to at least one instruction, each frame of the video including an image of the face;
   obtaining frames from the video during said capturing operation;
   calculating an alignment measure for each obtained frame;
   determining groups of frames from the obtained frames;
   calculating a composite alignment measure for each frame group;
   determining a peak composite alignment measure and a corresponding peak frame group, each frame in the peak frame group including an image that can be used for generating accurate authentication transaction results to authenticate the user; and
   storing, in the mobile device, the image from one frame in the peak frame group.

2. The method for capturing biometric data in accordance with claim 1, said calculating an alignment measure operation comprising:
   determining an area of the image in the frame, the area having a top part and a bottom part;
   determining top point coordinates and bottom point coordinates, the top point being in the top part and the bottom point being in the bottom part; and
   calculating the distance between the top and bottom points.

3. The method for capturing biometric data in accordance with claim 1, said calculating a composite alignment measure operation comprising averaging frame group alignment measures.

4. The method for capturing biometric data in accordance with claim 1, further comprising displaying the at least one instruction on a mobile device screen, the at least one instruction prompting rotation of the face towards and away from the mobile device.

5. An apparatus for capturing biometric data comprising:
   a processor; and
   a memory configured to store data, said apparatus being associated with a network and said memory being in communication with said processor and having instructions stored thereon which, when executed by said processor, cause said apparatus to:
   capture in a video, while said apparatus is aimed at the face of a user, images of the face rotating in response to at least one instruction, each frame of the video including an image of the face, obtain frames from the video while capturing the video, calculate an alignment measure for each obtained frame, determine frame groups from the obtained frames, calculate a composite alignment measure for each group, determine a peak composite alignment measure and a corresponding peak frame group, each frame in the peak frame group including an image that can be used for generating accurate authentication results to authenticate the user, and store the image from one frame in a peak frame group in said memory.

6. The apparatus for capturing biometric data in accordance with claim 5, said apparatus being one of the following:

a smart phone;
a tablet computer;
a laptop computer; and
a personal digital assistant.

7. The apparatus for capturing biometric data in accordance with claim 5, wherein the instructions further cause said apparatus to display the at least one instruction, the at least one instruction prompting the user to rotate the face towards and away from said apparatus.

8. A non-transitory computer-readable recording medium included in a mobile device having a computer program recorded thereon for capturing user biometric data, the computer program being comprised of instructions, which when read and executed by the mobile device, cause the mobile device to perform at least the following operations:

capture as a video, while the mobile device is aimed at the face of a user, images of the face rotating in response to at least one instruction, each frame of the video including an image of the biometric characteristic;

obtain frames from the video while capturing the video;

calculate an alignment measure for each frame;

determine frame groups from the obtained frames;

calculate a composite alignment measure for each group;

determine a peak composite alignment measure and a corresponding peak frame group, each frame in the peak frame group including an image that can be used for generating accurate authentication transaction results to authenticate the user; and store the image from one frame in the peak frame group.

9. The computer program in accordance with claim 8 further comprising instructions, which when read and executed by the mobile device, cause the mobile device to display the at least one instruction, the at least one instruction prompting the user to rotate the face towards and away from the mobile device.

* * * * *